US012714072B2

(12) United States Patent
Ito et al.

(10) Patent No.: US 12,714,072 B2
(45) Date of Patent: Aug. 25, 2026

(54) FREE-RANGE LIVESTOCK MANAGEMENT SERVER APPARATUS, SYSTEM, METHOD, AND PROGRAM

(71) Applicants: NEC COMMUNICATION SYSTEMS, LTD., Tokyo (JP); SHINSHU UNIVERSITY, Nagano (JP)

(72) Inventors: Chikashi Ito, Tokyo (JP); Kenichi Abe, Tokyo (JP); Norihiko Kamata, Tokyo (JP); Tetsuya Ito, Tokyo (JP); Akira Matsumoto, Tokyo (JP); Momo Suto, Tokyo (JP); Satoki Ueno, Tokyo (JP); Masakazu Kaneda, Tokyo (JP); Kenichi Takeda, Nagano (JP)

(73) Assignees: NEC COMMUNICATION SYSTEMS, LTD., Tokyo (JP); SHINSHU UNIVERSITY, Matsumoto City (JP)

( * ) Notice: Subject to any disclaimer, the term of this patent is extended or adjusted under 35 U.S.C. 154(b) by 14 days.

(21) Appl. No.: 18/852,187

(22) PCT Filed: Mar. 23, 2023

(86) PCT No.: PCT/JP2023/011482
§ 371 (c)(1),
(2) Date: Sep. 27, 2024

(87) PCT Pub. No.: WO2023/190024
PCT Pub. Date: Oct. 5, 2023

(65) Prior Publication Data
US 2025/0212846 A1 Jul. 3, 2025

(30) Foreign Application Priority Data
Mar. 31, 2022 (JP) ................................ 2022-060310

(51) Int. Cl.
*A01K 29/00* (2006.01)
*G06V 10/77* (2022.01)
*G06V 40/10* (2022.01)

(52) U.S. Cl.
CPC ........ *A01K 29/005* (2013.01); *G06V 10/7715* (2022.01); *G06V 40/10* (2022.01)

(58) Field of Classification Search
CPC .... A01K 29/005; A01K 11/008; A01K 29/00; G06V 10/7715; G06V 40/10; Y02A 40/70
(Continued)

(56) References Cited

U.S. PATENT DOCUMENTS 9,504,387 B2 * 11/2016 Alonsoperez ........ A61B 5/0022
9,848,577 B1 12/2017 Brandao et al.
(Continued)

FOREIGN PATENT DOCUMENTS

CN 108647846 A 10/2018
CN 110378553 A 10/2019
(Continued)

OTHER PUBLICATIONS

International Search Report in International Application No. PCT/JP2023/011482, dated Apr. 25, 2023.
(Continued)

*Primary Examiner* — Omar Casillashernandez
(74) *Attorney, Agent, or Firm* — Sughrue Mion, PLLC

(57) ABSTRACT

A free-range livestock management server apparatus acquires information related to an individual animal or a location; identifies the individual animal based on acquired information; identifies location based on acquired information; grasps condition of individual animal or the location based on acquired information; monitors an abnormal condition of the individual animal or the location based on acquired information; sorts the information related to iden-
(Continued)

tified individual animal, identified location, grasped condition, and monitored abnormal condition for the identified individual animal or the identified location to associate each piece of the information with the identified individual animal or the identified location; stores the sorted and associated information; determines urgency of information related to abnormal condition of the individual animal or the location among the stored information based on a preset criterion; and creates notification information based on the information determined urgent to transmit the notification information to a predetermined terminal(s).

20 Claims, 9 Drawing Sheets

(58) Field of Classification Search
USPC ........................................................ 340/573.3
See application file for complete search history.

(56) References Cited

U.S. PATENT DOCUMENTS

| | | | | |
|---|---|---|---|---|
| 10,242,547 | B1 | 3/2019 | Struhsaker et al. | |
| 10,375,928 | B2 | 8/2019 | Yajima et al. | |
| 10,482,748 | B2 | 11/2019 | Struhsaker et al. | |
| 12,369,568 | B1 * | 7/2025 | New .................... | G08B 21/182 |
| 2014/0350410 | A1 * | 11/2014 | Axelsson ............. | A61B 5/0077 600/476 |
| 2017/0202185 | A1 | 7/2017 | Trumbull et al. | |
| 2018/0295809 | A1 * | 10/2018 | Yajima ................. | H04B 17/318 |
| 2019/0130728 | A1 | 5/2019 | Struhsaker et al. | |
| 2023/0413782 | A1 * | 12/2023 | Trimble .................. | A01K 7/02 |
| 2024/0373826 | A1 * | 11/2024 | Wildisen ................ | A01K 29/00 |

FOREIGN PATENT DOCUMENTS

| | | | |
|---|---|---|---|
| CN | 112462829 | A | 3/2021 |
| CN | 112637962 | A | 4/2021 |
| CN | 113507690 | A | 10/2021 |
| CN | 114118755 | A | 3/2022 |
| JP | 2011-234668 | A | 11/2011 |
| JP | 2011-244736 | A | 12/2011 |
| JP | 2017-201930 | A | 11/2017 |
| JP | 2019-122368 | A | 7/2019 |
| JP | 2020-505798 | A | 2/2020 |
| JP | 2022-031005 | A | 2/2022 |
| WO | 2017/046997 | A1 | 3/2017 |
| WO | 2017/158698 | A1 | 9/2017 |
| WO | 2019/225312 | A1 | 11/2019 |
| WO | 2020/261927 | A1 | 12/2020 |
| WO | 2022/003809 | A1 | 1/2022 |

OTHER PUBLICATIONS

Written Opinion in International Application No. PCT/JP2023/011482, dated Apr. 25, 2023.

Chinese Office Action dated Dec. 25, 2025, issued in Chinese application No. 202380031468.4.

* cited by examiner

1
CAMERA
40
CAMERA
40
SENSOR
50
SENSOR
50
FACILITY
60
FACILITY
60
NETWORK
90
MANAGEMENT TERMINAL
80
FREE-RANGE LIVESTOCK MANAGEMENT SERVER APPARATUS
10
MOBILE TERMINAL
30
MOBILE TERMINAL
30
DISPLAY DEVICE
70
DISPLAY DEVICE
70

FREE ACCESS STALL
FREE AREA
PASTURE, OUTDOOR PLAYGROUND

Figure 3:
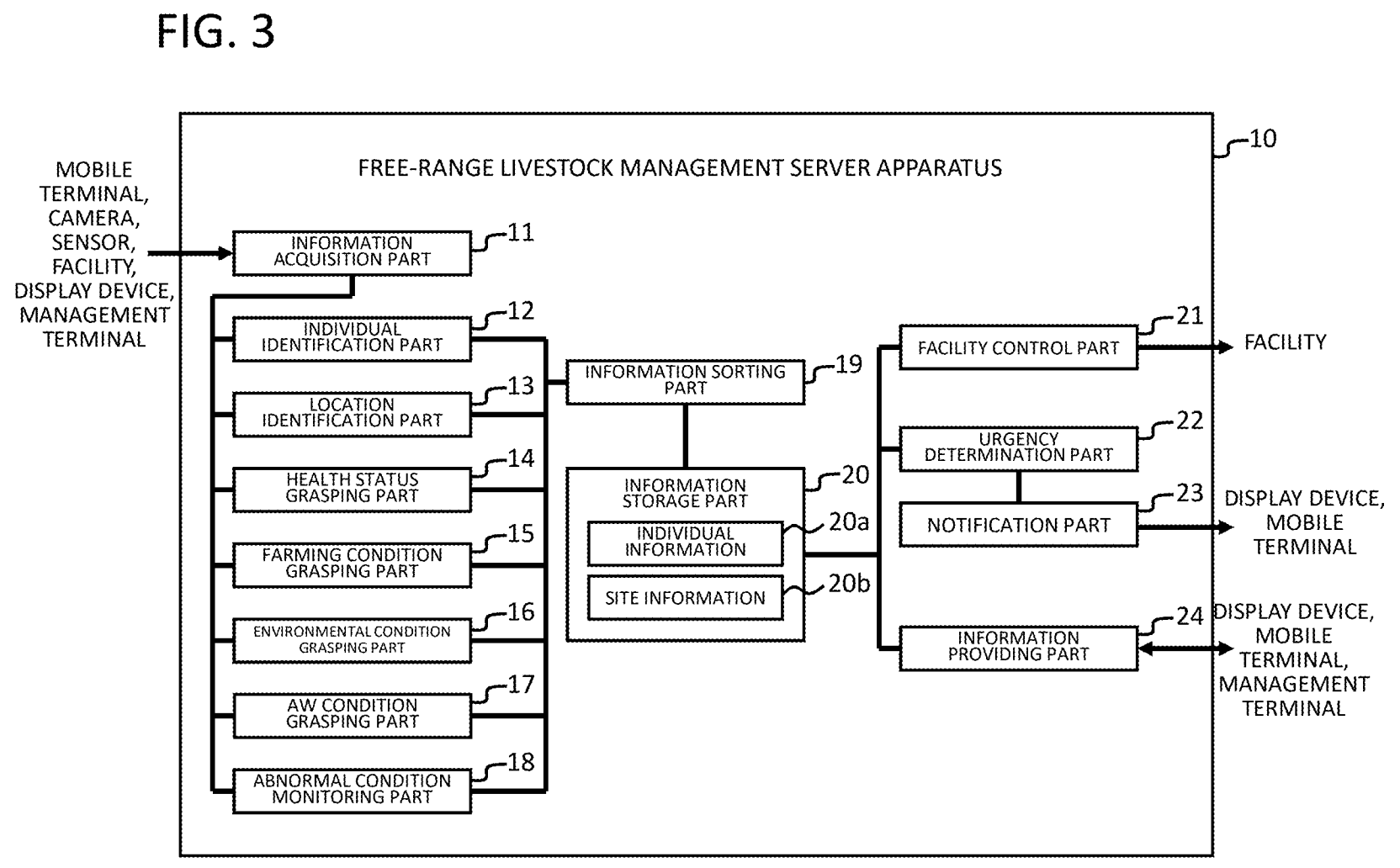

FREE-RANGE LIVESTOCK MANAGEMENT SERVER APPARATUS

10

MOBILE TERMINAL, CAMERA, SENSOR, FACILITY, DISPLAY DEVICE, MANAGEMENT TERMINAL

11 INFORMATION ACQUISITION PART

12 INDIVIDUAL IDENTIFICATION PART

13 LOCATION IDENTIFICATION PART

14 HEALTH STATUS GRASPING PART

15 FARMING CONDITION GRASPING PART

16 ENVIRONMENTAL CONDITION GRASPING PART

17 AW CONDITION GRASPING PART

18 ABNORMAL CONDITION MONITORING PART

19 INFORMATION SORTING PART

20 INFORMATION STORAGE PART

20a INDIVIDUAL INFORMATION

20b SITE INFORMATION

21 FACILITY CONTROL PART

FACILITY

22 URGENCY DETERMINATION PART

23 NOTIFICATION PART

DISPLAY DEVICE, MOBILE TERMINAL

24 INFORMATION PROVIDING PART

DISPLAY DEVICE, MOBILE TERMINAL, MANAGEMENT TERMINAL

FIG. 4

[INDIVIDUAL INFORMATION]

| ANIMAL ID 5 | HANAKO |
| --- | --- |
| AGE IN MONTH | ADVANCED AGE |
| TEMPERAMENT | DOCILE |
| FIGHTING HISTORY | 1 INSTANCE OF BEING A VICTIM |
| WEIGHT | 300kg |
| PREGNANCIES | 2 TIMES |
| VACCINATION HISTORY | 6/10 |
| FOOD INTAKE OF THE DAY | 5kg |
| LAST MEAL | 6 HOURS AGO |
| WATER INTAKES | 10 TIMES |
| STALL USE | DURING FEEDING |
| HEALTH STATUS | BAD (INJURY) |
| ANIMAL WELFARE CONDITIONS | BCS, ..... |

FIG. 5

[SITE INFORMATION]

| LOCATION ID | INDIVIDUAL | FARMING CONDITIONS | ENVIRONMENTAL CONDITIONS | ANIMAL WELFARE CONDITIONS |
|---|---|---|---|---|
| ENTIRE FS | 2 | | 15°C, HIGH HUMIDITY, AIR CONDITIONED | NUMBER OF WATER TROUGHS、 · · · · · |
| FS1 | ID1 | FEEDING | 15°C | · · · · · · |
| FS2 | | FEED SHORTAGE, RESUPPLY NEEDED | 15°C | · · · · · · |
| FS3 | ID2 | REST | 15°C | · · · · · · |
| FS4 | | WATER SHORTAGE, RESUPPLY NEEDED | 15°C | · · · · · · |
| ENTIRE FA | 4 | | 15°C, HIGH HUMIDITY, AIR CONDITIONED | CLEANLINESS, · · · · · · |
| FA1 | | | 15°C | · · · · · · |
| FA2 | ID4、 ID5 | ONGOING FIGHTING, ACTION NEEDED | 15°C | · · · · · · |
| FA3 | ID3 | REST | 15°C | · · · · · · |
| FA4 | | | 15°C | HIGH WASTE ACCUMULATION, CLEANING REQUIRED · · · · · |
| FA5 | ID6 | MOVING | 12°C | · · · · · · |
| ENTIRE P | 1 | | RAIN, 8°C | · · · · · · |
| P1 | ID7 | REST | RAIN, 8°C, LOW TEMPERATURE, RELOCATION REQUIRED | · · · · · · |
| P2 | | | RAIN, 8°C | · · · · · · |
| P3 | | | RAIN, 8°C | · · · · · · |
| P4 | | | RAIN, 8°C | · · · · · · |

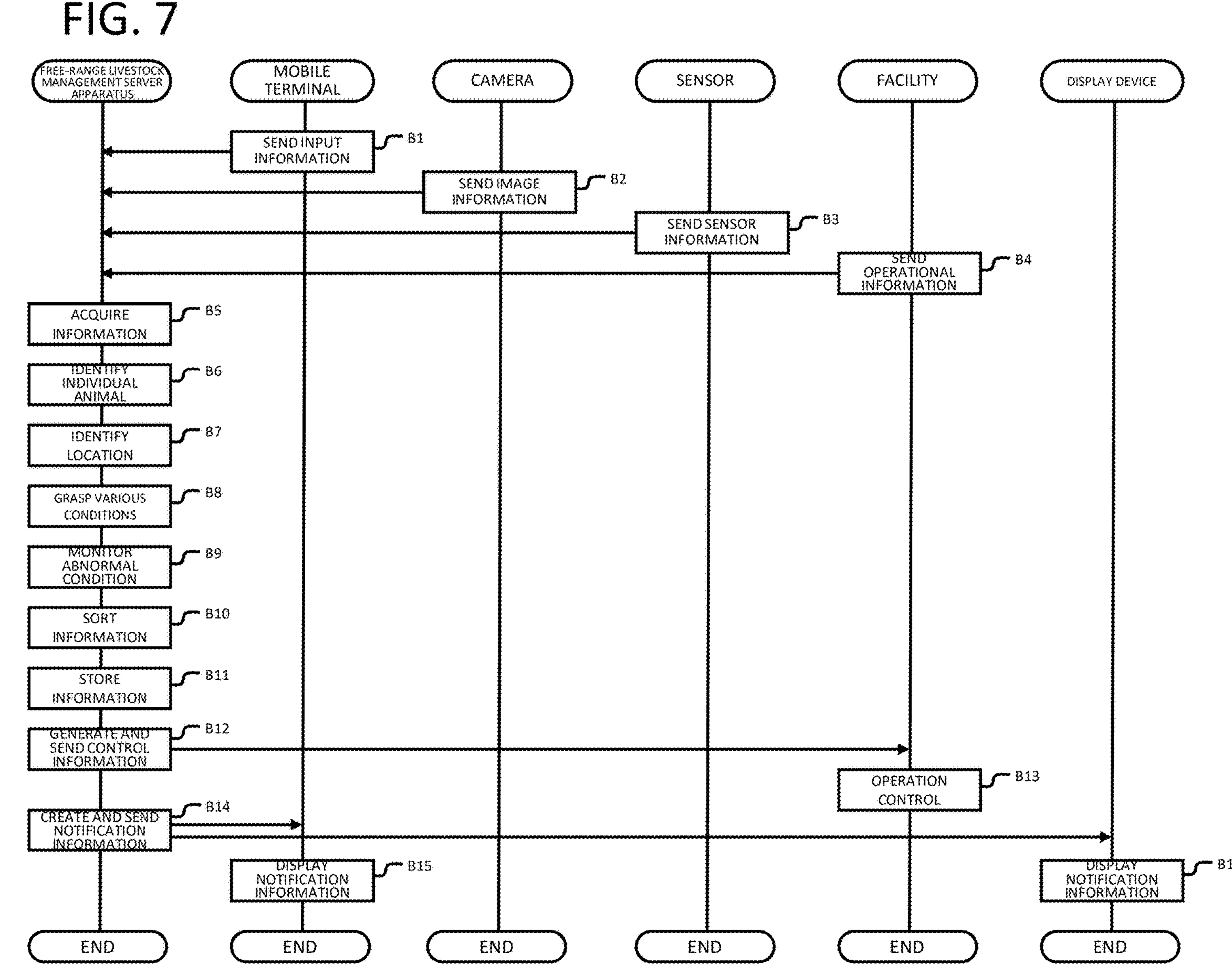
FIG. 7
FREE-RANGE LIVESTOCK MANAGEMENT SERVER APPARATUS
MOBILE TERMINAL
CAMERA
SENSOR
FACILITY
DISPLAY DEVICE
SEND INPUT INFORMATION
B1
SEND IMAGE INFORMATION
B2
SEND SENSOR INFORMATION
B3
SEND OPERATIONAL INFORMATION
B4
ACQUIRE INFORMATION
B5
IDENTIFY INDIVIDUAL ANIMAL
B6
IDENTIFY LOCATION
B7
GRASP VARIOUS CONDITIONS
B8
MONITOR ABNORMAL CONDITION
B9
SORT INFORMATION
B10
STORE INFORMATION
B11
GENERATE AND SEND CONTROL INFORMATION
B12
OPERATION CONTROL
B13
CREATE AND SEND NOTIFICATION INFORMATION
B14
DISPLAY NOTIFICATION INFORMATION
B15
DISPLAY NOTIFICATION INFORMATION
B16
END
END
END
END
END
END

FREE-RANGE LIVESTOCK MANAGEMENT SERVER APPARATUS, SYSTEM, METHOD, AND PROGRAM

CROSS-REFERENCE TO RELATED APPLICATION

This is a National Stage Application of International Application No. PCT/JP2023/011482 filed Mar. 23, 2023, claiming priority based on Japanese Patent Application No. 2022-060310 filed Mar. 31, 2022. The present invention relates to a free-range livestock management server apparatus, system, method, and program.

FIELD

Background

In animal husbandry, there is an increasing trend of management methods shifting from traditional stall-based husbandry to free-range farming on pastures that places importance on animal welfare (AW). Here, animal welfare is defined as the physical and mental state of animals, aiming to precisely manage livestock to continuously grasp their ever-changing conditions. This includes not only disease prevention but also providing a comfortable living environment for the animals. In free-range farming, livestock can move around freely, leading to changes in the environment in which they live and potentially increasing new tasks previously unnecessary for producers. Therefore, a system has been developed to monitor free-range livestock and reduce the workload for producers.

For instance, Patent Literature 1 discloses a display system comprising a server including a storage part that stores location information of each of a plurality of livestock at a rearing site in association with attribute information of the livestock, a communication part that transmits information specifying the attribute information of a particular animal to the server and acquires the location information of the specified animal from the server, and a display control part that displays the location of the specified animal at the rearing site on the basis of the acquired location information of the specified animal.

Further, Patent Literature 2 discloses a livestock management system including a stay determination unit that determines, on the basis of data regarding a plurality of individual identification signals transmitted from a transmission apparatus that is attached to a livestock animal and transmits the individual identification signal made corresponding to the livestock animal, whether or not the livestock animal is staying within a target region corresponding to the individual identification signal.

Further, Patent Literature 3 discloses a system for monitoring livestock in a ranching environment. The system includes tag sensors attached to animals and configured to collect monitoring data from the animals, a first access point configured to receive the collected monitoring data from the tag sensors and to process the collected monitoring data, an Internet of Things (IoT) link established between each of the tag sensors and the access point, an IoT communication protocol overlay that enables synchronized uplinks from the tag sensors to the first access point via the IoT links and that governs transmissions of monitoring data by the tag sensors to the access point and a hub/cloud platform configured to receive the processed monitoring data from the first access point, perform data analytics on the processed monitoring data, and provide a user interface that enables a user to monitor the livestock.

[Patent Literature 1]
International Publication Number WO2020/261927A
[Patent Literature 2]
International Publication Number WO2017/46997
[Patent Literature 3]
Japanese Patent Kohyo Publication No. JP-P2020-505798A

SUMMARY

The following analysis is provided by the inventors of the present application.

In free-range farming, however, the mingling and interaction of livestock may lead to changes in social behavior, disrupting the feeding and sleeping balance and raising concerns about disease and stress. Therefore, for the systems described in Patent Literatures 1 to 3, which monitor the location of livestock within stalls and the ancillary facilities thereof, it is difficult to grasp the conditions of free-range livestock that comply with the concept of animal welfare and any abnormal condition deviating therefrom.

Moreover, in free-range farming, the unrestricted movement of livestock results in varying locations of the animals and environments surrounding them. For instance, it is impossible to confine waste to a specific area, and unnecessary tasks such as increased cleaning and feed replacement and a work delay due to a sudden deterioration may occur. Therefore, the system(s) described in Patent Literatures 1 to 3, which monitor the location(s) of livestock, are difficult in detecting abnormal condition(s) in a livestock farm where animals are allowed to roam freely.

It is a main object of the present invention to provide a free-range livestock management server apparatus, system, method, and program that can contribute to grasping the condition(s) of free-range livestock and the farming site, and identifying any abnormal condition deviating therefrom.

A free-range livestock management server apparatus relating to a first aspect comprises: an information acquisition part configured to acquire information related to an individual animal or a location at a farming site from an external source: an individual identification part configured to identify the individual animal on the basis of the acquired information: a location identification part configured to identify the location on the basis of the acquired information: a condition grasping part configured to grasp a condition(s) of the individual animal or the location on the basis of the acquired information: an abnormal condition monitoring part configured to monitor an abnormal condition of the individual animal or the location on the basis of the acquired information: an information sorting part configured to sort each piece of the information obtained by the individual identification part, the location identification part, the condition grasping part, and the abnormal condition monitoring part for the identified individual animal or the identified location and associate each piece of the information with the identified individual animal or the identified location: an information storage part configured to store the information sorted for and associated with the individual animal or the location: an urgency determination part configured to determine urgency of information related to the abnormal condition of the individual animal or the location among the stored information on the basis of a preset criterion; and a notification part configured to create notification information on the basis of the information determined to be urgent and transmit the notification information to a predetermined terminal(s).

A free-range livestock management system relating to a second aspect comprises: the free-range livestock management server apparatus relating to the first aspect: a camera(s) installed at a predetermined location(s) of a farming site and communicatively connected to the free-range livestock management server apparatus: a sensor(s) installed at a predetermined location(s) of the farming site and communicatively connected to the free-range livestock management server apparatus; and a terminal(s) communicatively connected to the free-range livestock management server apparatus.

A free-range livestock management method relating to a third aspect is a free-range livestock management method for managing free-range livestock and a farming site using hardware resources that includes: acquiring information related to an individual animal or a location at a farming site from an external source: identifying the individual animal on the basis of the acquired information: identifying the location on the basis of the acquired information: grasping a condition(s) of the individual animal or the location on the basis of the acquired information: monitoring an abnormal condition of the individual animal or the location on the basis of the acquired information: sorting each piece of the information related to the identified individual animal, the identified location, the grasped condition(s), and the monitored abnormal condition for the identified individual animal or the identified location and associating each piece of the information with the identified individual animal or the identified location: storing the information sorted for and associated with the individual animal or the location: determining urgency of information related to the abnormal condition of the individual animal or the location among the stored information on the basis of a preset criterion (or criteria); and creating notification information on the basis of the information determined to be urgent and transmitting the notification information to a predetermined terminal(s).

A program relating to a fourth aspect causes hardware resources to execute a process of managing free-range livestock and a farming site and causes the hardware resources to execute: a process of acquiring information related to an individual animal or a location at a farming site from an external source: a process of identifying the individual animal on the basis of the acquired information: a process of identifying the location on the basis of the acquired information: a process of grasping condition(s) of the individual animal or the location on the basis of the acquired information: a process of monitoring an abnormal condition of the individual animal or the location on the basis of the acquired information: a process of sorting each piece of the information related to the identified individual animal, the identified location, the grasped condition(s), and the monitored abnormal condition for the identified individual animal or the identified location and associating each piece of the information with the identified individual animal or the identified location: a process of storing the information sorted for and associated with the individual animal or the location: a process of determining urgency of information related to the abnormal condition of the individual animal or at the location among the stored information on the basis of a preset criterion (or criteria); and a process of creating notification information on the basis of the information determined to be urgent and transmitting the notification information to a predetermined terminal(s).

Further, the program(s) can be stored in a computer-readable storage medium. The storage medium may be a non-transitory one such as a semiconductor memory, a hard disk, a magnetic recording medium, an optical recording medium, and the like. Further, the present invention can also be realized as a computer program product. The program is supplied to a computer apparatus using an input device or from the outside via a communication interface, stored in a storage device, and operates a processor according to predetermined steps or processes. The program is capable of displaying the processing results thereof including an intermediate state, as necessary, via a display device step by step or is able to communicate with the outside via a communication interface. For instance, the computer apparatus for this purpose comprises a processor, a storage device, an input device, a communication interface, and a display device, if necessary, that can typically be connected to each other by a bus.

According to the first to the fourth aspects, it is possible to contribute to grasping the conditions of free-range livestock and the farming site, and identifying any abnormal condition(s) deviating therefrom.

BRIEF DESCRIPTION OF DRAWINGS

FIG. 2 is a schematic illustration showing an example of a farming site to which the free-range livestock management system relating to Example Embodiment 1 is applied.

FIG. 3 is a block diagram schematically illustrating a configuration of a free-range livestock management server apparatus in the free-range livestock management system relating to Example Embodiment 1.

FIG. 4 is a schematic diagram showing an example of individual information stored in the free-range livestock management server apparatus in the free-range livestock management system relating to Example Embodiment 1.

FIG. 5 is a schematic diagram showing an example of site information stored in the free-range livestock management server apparatus in the free-range livestock management system relating to Example Embodiment 1.

FIG. 7 is a sequence chart schematically showing an operation of the free-range livestock management system relating to Example Embodiment 1.

MODES

Figure 1:
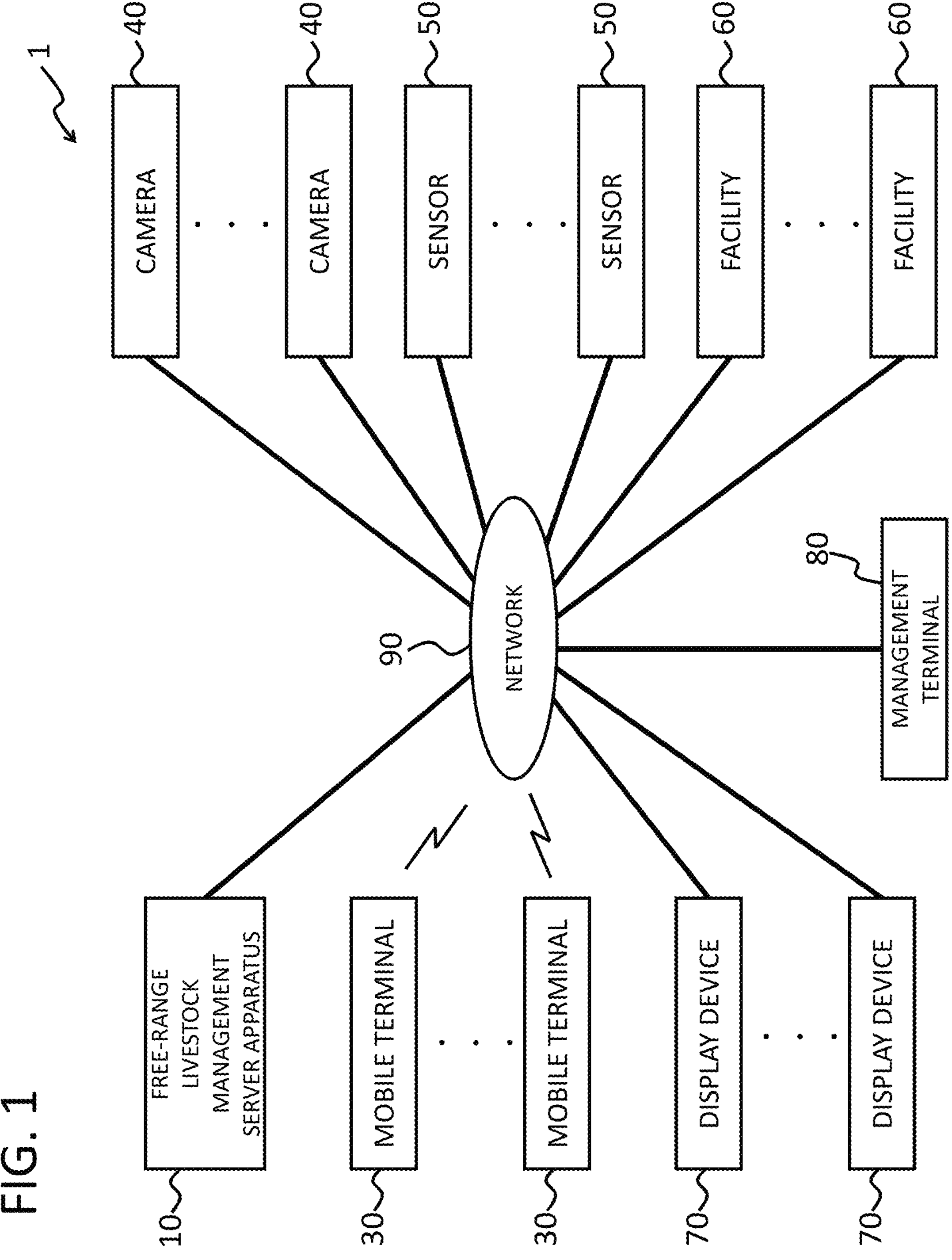
FIG. 1 is a block diagram schematically illustrating a configuration of a free-range livestock management system relating to Example Embodiment 1.

Example embodiments will be described with reference to the drawings. It should be noted that the drawing reference signs herein are given mainly to facilitate understanding and are not intended to limit the present invention to the illustrated modes. Further, the following example embodiments are merely examples and do not limit the present invention. Connection lines between blocks in the drawings referred to in the following description can be both bidirectional and unidirectional. A unidirectional arrow schematically shows a main flow of a signal (data) and does not exclude bidirectionality. Further, in a circuit diagram, block diagram, internal configuration diagram, and connection diagram shown in the disclosure of the present application, the input and output ends of each connection line have an input port and an output port, respectively, although not shown explicitly. The same applies to input/output interfaces. A program is executed by a computer apparatus, and the computer apparatus comprises, for instance, a processor, storage device, input device, communication interface, and a display device as necessary. The computer apparatus is configured to be able to perform wired or wireless communication with an internal device therein or with an external device (including a computer) via the communication interface.

Example Embodiment 1

Figure 2:
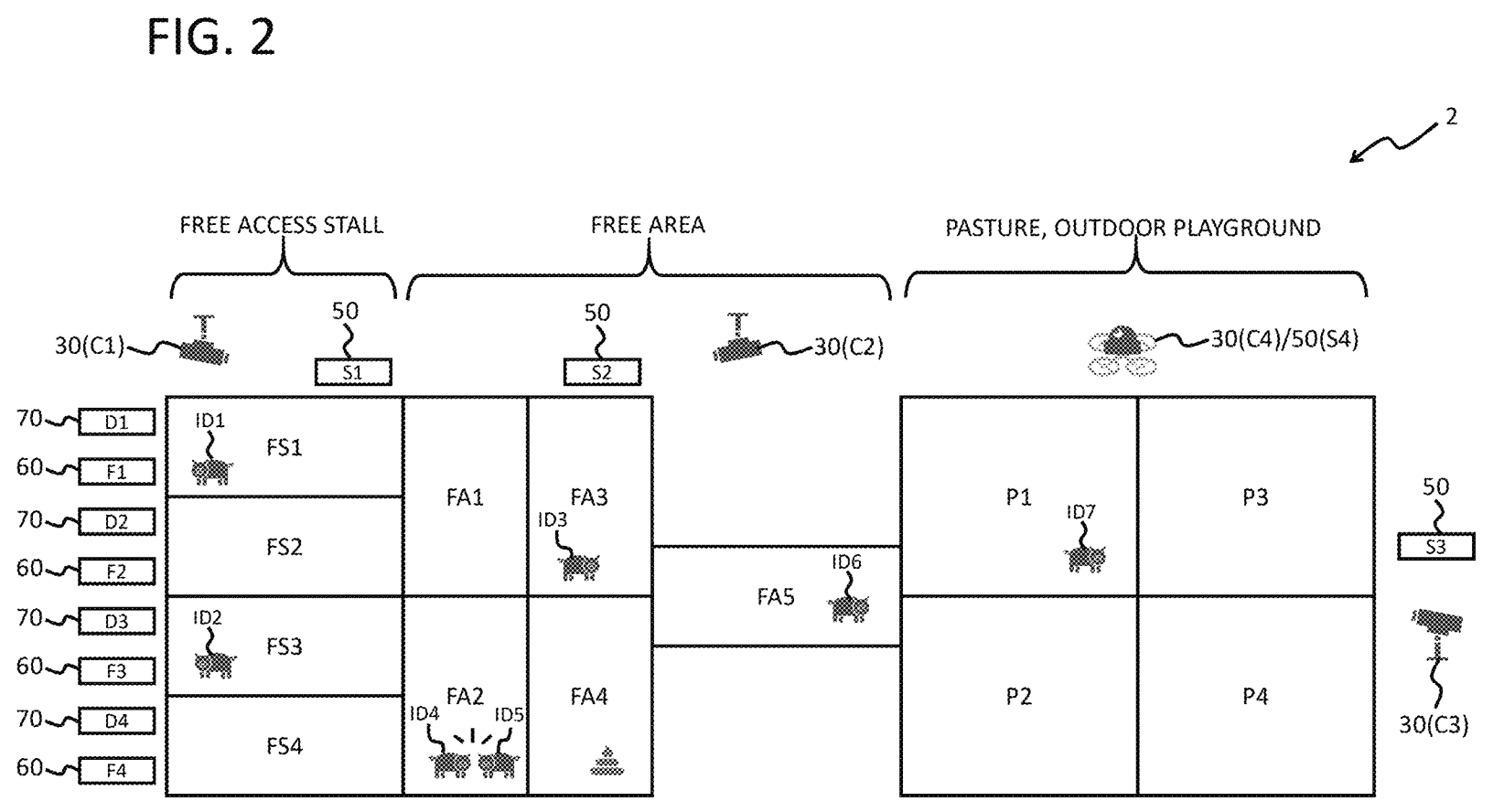

The following describes a free-range livestock management system relating to Example Embodiment 1 with reference to the drawings. FIG. 1 is a block diagram schematically illustrating a configuration of the free-range livestock management system relating to Example Embodiment 1. FIG. 2 is a schematic illustration showing an example of a farming site to which the free-range livestock management system relating to Example Embodiment 1 is applied. FIG. 3 is a block diagram schematically illustrating a configuration of a free-range livestock management server apparatus in the free-range livestock management system relating to Example Embodiment 1. FIG. 4 is a schematic diagram showing an example of individual information stored in the free-range livestock management server apparatus in the free-range livestock management system relating to Example Embodiment 1. FIG. 5 is a schematic diagram showing an example of site information stored in the free-range livestock management server apparatus in the free-range livestock management system relating to Example Embodiment 1.

The free-range livestock management system 1 is a system (refer to FIG. 1) that manages information regarding livestock (such as pigs, cows, chickens, etc.) freely roaming in a farming site (for instance, refer to 2 in FIG. 2) and information regarding the farming site 2. The free-range livestock management system 1 comprises functionality of detecting abnormal condition(s) concerning the livestock and the farming site 2 and notifying an operator accordingly. The free-range livestock management system 1 comprises the free-range livestock management server apparatus 10, a plurality of (or even a single) mobile terminals 30, a plurality of (or even a single) cameras 40, a plurality of (or even a single) sensors 50, a plurality of (or even a single) facilities 60, a plurality of (or even a single) display devices 70, and a network 90.

Here, the farming site 2 is a site where livestock are allowed to roam freely, and it may be a site with a free access stall having a swinging door for the animals to enter and exit without restrictions, a free area where they can roam freely, pasture, and an outdoor playground, as illustrated in FIG. 2. The farming site 2 can also include a barn, a feeding area, and an inspection passage.

The free-range livestock management server apparatus 10 is a server apparatus that manages information regarding livestock freely roaming in the farming site (2 in FIG. 2) and information regarding the farming site 2 (refer to FIG. 1). As the free-range livestock management server apparatus 10, for instance, a server apparatus comprising a computer that includes a processor, a memory, a network interface, etc., may be used. The free-range livestock management server apparatus 10 is connected to the mobile terminals 30, the cameras 40, the sensors 50, the facilities 60, and the display devices 70 via the network 90, enabling both wireless and wired communication. In the example of FIG. 3, the free-range livestock management server apparatus 10 can be configured to virtually comprise an information acquisition part 11, an individual identification part 12, a location identification part 13, a health status grasping part 14, a farming condition grasping part 15, an environmental condition grasping part 16, an AW condition grasping part 17, an abnormal condition monitoring part 18, an information sorting part 19, an information storage part 20, a facility control part 21, an urgency determination part 22, a notification part 23, and an information providing part 24 by using the memory and having the processor execute a program (refer to FIG. 3).

The information acquisition part 11 is a functional part that acquires (collects) various types of information from external sources (the mobile terminals 30, the cameras 40, the sensors 50, the facilities 60, the display devices 70, a management terminal 80, etc.) (refer to FIG. 3). The acquired information includes, for instance, text information, image information, detected information, and operational information. The types of information include information for identifying individual animals, identifying locations, grasping (understanding) health status, grasping farming conditions, grasping environmental condition(s), ascertaining compliance with animal welfare principle(s), and monitoring abnormal condition(s). The information acquisition part 11 is able to collect information from external sources automatically or manually. Additionally, information that cannot be collected automatically, such as vaccination information and birth records, is obtained manually from the mobile terminal 30, the management terminal 80, or an information terminal (not shown) of an authorized individual (such as a veterinarian). The information acquisition part 11 outputs and allocates the acquired information to any one of the individual identification part 12, the location identification part 13, the health status grasping part 14, the farming condition grasping part 15, the environmental condition grasping part 16, the AW condition grasping part 17, and the abnormal condition monitoring part 18 according to the type of the information.

The individual identification part 12 is a functional part that identifies an individual animal related to the information from the information acquisition part 11 on the basis of the information (refer to FIG. 3). The individual identification part 12 may analyze the information from the information acquisition part 11 to extract feature(s) of the individual animal and identify the animal by referring to preset information with respect to the feature(s) of individual animal(s). For instance, the preset information regarding the features of individual animals can be an individual identification database (not shown) in which unique individual identification information given to each individual animal is associated with the characteristics (features) of each individual animal. When the information from the information acquisition part 11 is obtained from the mobile terminal 30 or the management terminal 80, the individual identification part 12 may identify an individual animal on the basis of the individual identification information included therein. Further, when the information from the information acquisition part 11 is, for instance, image information captured by the camera 40 that includes identification information (such as QR (Quick Response) codes, two-dimensional barcodes, or painted numbers or letters on individual animal(s), information (such as color patterns) marked on the livestock's body surfaces, etc.), the individual identification part 12 may extract identification information (corresponding to features) by performing image analysis on the information, extract the individual identification information corresponding to the identification information, and identify an individual animal. When the information from the information acquisition part 11 is, for instance, identification information read by the sensor 50, the individual identification part 12 may extract the individual identification information corresponding to the identification information (equivalent to feature(s)) to identify an individual animal. Further, when the information from the information acquisition part 11 is information captured by the camera 40 (the display device 70 with a camera such as an RGB camera, a hyperspectral camera, a thermal camera, etc.), the individual identification part 12 may extract features such as physique, behavioral patterns, vein patterns, stains, and body temperature distribution by performing image analysis on the information, extract the individual identification information corresponding to the feature(s), and identify an individual animal. Additionally, when the information from the information acquisition part 11 is information detected by the sensor 50 (such as an RFID (Radio Frequency Identifier) reader or the display device 70 with an RFID), the individual identification part 12 may extract the individual identification information corresponding to the detected information (feature(s)) to identify an individual animal. The individual identification part 12 outputs information that includes the extracted individual identification information to the information sorting part 19. The information outputted by the individual identification part 12 may include time information and source information included in the information from the information acquisition part 11.

The location identification part 13 is a functional part that identifies each section of the farming site 2 related to the information from the information acquisition part 11 on the basis of the information (refer to FIG. 3). The location identification part 13 can be used to identify the location of an individual animal or the location of an abnormal condition(s). The location identification part 13 may identify a location by analyzing information from the information acquisition part 11, extracting feature(s) of a location, and referring to preset information with respect to the feature(s) of location(s). For instance, the preset information regarding the features of locations can be a location identification database (not shown) in which unique location identification information given to each location is associated with one or more characteristics (features) of each location. When the information from the information acquisition part 11 is obtained from the mobile terminal 30 or the management terminal 80, the location identification part 13 may identify a location on the basis of the location identification information included therein. Further, when the information from the information acquisition part 11 is obtained from the camera 40, the sensor 50, the facility 60, or the display device 70 (with a camera or sensor), the location identification part 13 may identify a location by extracting the location identification information corresponding to identification information (feature(s)) included in the information and related to the camera 40, the sensor 50, the facility 60, or the display device 70. Additionally, when the information from the information acquisition part 11 is obtained by the camera 40 capturing a plurality of locations, the location identification part 13 may extract the location identification information corresponding to identification information (a first feature) included in the information and related to the camera 40 and the location of the image in the information (a second feature) to identify a location. The location identification part 13 outputs information that includes the extracted location identification information to the information sorting part 19. The information outputted by the location identification part 13 may include time information and source information included in the information from the information acquisition part 11.

The health status grasping part 14 is a functional part that grasps the health status of livestock on the basis of the information from the information acquisition part 11 (refer to FIG. 3). The health status grasping part 14 may grasp health status by analyzing the information from the information acquisition part 11, extracting health status feature(s), and referring to preset information related to health status feature(s). For instance, the preset information regarding health status feature(s) can be a health status grasping database (not shown) in which a health status is associated with the characteristics (feature(s)) with respect to the health status. When the information from the information acquisition part 11 is obtained from the mobile terminal 30 or the management terminal 80, the health status grasping part 14 may grasp health status on the basis of the information related to health status included therein. Further, when the information from the information acquisition part 11 is information captured by the camera 40 (the display device 70 with a camera), the health status grasping part 14 may grasp health status by performing image analysis on the information to extract the features related to health status and extracting the health status corresponding to the extracted features. The health status grasping part 14 outputs information that includes information related to the observed health status to the information sorting part 19. The information outputted by the health status grasping part 14 may include time information and source information included in the information from the information acquisition part 11.

Here, examples of health status include livestock's behavior, posture, physical condition, estrus, weaning, feeding frequency, weight gain or loss, sleep duration, exercise amount, and rest time or the like. Behavior examples include how they search for food, how explore their surroundings, how dig holes with their noses, and how chew on environmental enrichment devices that may promote behavioral manifestations in animals, nest-building behavior, frequency of fights within a herd (social behavior), the way they interact with humans, and the way they lie down on grass or soil or the like.

The farming condition grasping part 15 is a functional part that grasps farming conditions on the basis of information from the information acquisition part 11 (refer to FIG. 3). The farming condition grasping part 15 may grasp farming condition(s) by analyzing the information from the information acquisition part 11, extracting features of farming condition(s), and referring to preset information related to feature(s) of farming condition(s). For instance, the preset information regarding the feature(s) of farming condition(s) can be a farming condition grasping database (not shown) in which farming conditions are associated with the characteristics (features) with respect to farming condition(s). When the information from the information acquisition part 11 is obtained from the mobile terminal 30 or the management terminal 80, the farming condition grasping part 15 may grasp farming condition(s) on the basis of the information related to farming condition(s) included therein. Further, when the information from the information acquisition part 11 is information captured by the camera 40 (the display device 70 with a camera), the farming condition grasping part 15 may grasp farming condition(s) by performing image analysis on the information to identify the feature(s) related to farming condition(s) and extracting the farming condition (s) corresponding to the extracted feature(s). Additionally, when the information from the information acquisition part 11 is obtained from the sensor 50 or the facility 60, the farming condition grasping part 15 may grasp farming condition(s) on the basis of the information related to farming condition(s) included therein. The farming condition grasping part 15 outputs information that includes information related to the observed farming condition(s) to the information sorting part 19. The information outputted by the farming condition grasping part 15 may include time information and source information included in the information from the information acquisition part 11.

Here, examples of farming conditions include stocking density, amount of bedding, quantity of materials, and amount of feed.

The environmental condition grasping part 16 is a functional part that grasps environmental condition(s) on the basis of the information from the information acquisition part 11 (refer to FIG. 3). The environmental condition grasping part 16 may grasp environmental condition(s) by analyzing the information from the information acquisition part 11, extracting feature(s) of environmental condition(s), and referring to preset information related to feature(s) of environmental condition(s). For instance, the preset information regarding the feature(s) of environmental condition (s) can be an environmental condition grasping database (not shown) in which environmental conditions are associated with the characteristic(s) (feature(s)) with respect to environmental condition(s). When the information from the information acquisition part 11 is obtained from the mobile terminal 30 or the management terminal 80, the environmental condition grasping part 16 may grasp environmental condition(s) on the basis of the information related to environmental condition(s) included therein. Further, when the information from the information acquisition part 11 is information captured by the camera 40 (the display device 70 with a camera), the environmental condition grasping part 16 may grasp environmental condition(s) by performing image analysis on the information to identify the features related to environmental conditions and extracting the environmental condition(s) corresponding to the extracted feature(s). Additionally, when the information from the information acquisition part 11 is obtained from the sensor 50 or the facility 60, the environmental condition grasping part 16 may grasp environmental condition(s) on the basis of the information related to environmental condition(s) included therein. The environmental condition grasping part 16 outputs information that includes information related to the observed environmental condition(s) to the information sorting part 19. The information outputted by the environmental condition grasping part 16 may include the time information and the source information included in the information from the information acquisition part 11.

Here, examples of environmental conditions include weather, outdoor temperature, indoor temperature, humidity, illuminance, and operating status of facilities.

The AW condition grasping part 17 is a functional part that ascertains compliance with animal welfare principles (hereinafter referred to as "animal welfare conditions") on the basis of the information from the information acquisition part 11 (refer to FIG. 3). The AW condition grasping part 17 may grasp animal welfare conditions by analyzing the information from the information acquisition part 11, extracting features (information or numerical values) of animal welfare conditions, and referring to preset information related to features of animal welfare conditions. For instance, the preset information regarding the features of animal welfare conditions can be an animal welfare condition grasping database (not shown) in which animal welfare conditions are associated with the characteristics (features) with respect to animal welfare conditions. When the information from the information acquisition part 11 is obtained from the mobile terminal 30 or the management terminal 80, the AW condition grasping part 17 may grasp animal welfare conditions on the basis of the information related to animal welfare conditions included therein. Further, when the information from the information acquisition part 11 is information captured by the camera 40 (the display device 70 with a camera), the AW condition grasping part 17 may grasp animal welfare conditions by performing image analysis on the information to identify the features related to animal welfare conditions and extracting the animal welfare conditions corresponding to the extracted features. Additionally, when the information from the information acquisition part 11 is obtained from the sensor 50 or the facility 60, the AW condition grasping part 17 may grasp animal welfare conditions on the basis of the information related to animal welfare conditions included therein. The AW condition grasping part 17 outputs information that includes information related to the observed animal welfare conditions to the information sorting part 19. The information outputted by the AW condition grasping part 17 may include time information and source information included in the information from the information acquisition part 11.

Here, examples of animal welfare conditions include various conditions listed in animal welfare assessment method(s) provided by the Japan Farm Animal Welfare Association and other organizations, as well as various conditions outlined in other standards related to animal welfare.

The abnormal condition monitoring part 18 is a functional part that monitors abnormal condition(s) on the basis of the information from the information acquisition part 11 (refer to FIG. 3). The abnormal condition monitoring part 18 may monitor abnormal conditions by analyzing the information from the information acquisition part 11, extracting feature(s) of abnormal condition(s), and referring to preset information related to feature(s) of abnormal condition(s). For instance, the preset information regarding the feature(s) of abnormal conditions can be an abnormal condition monitoring database (not shown) in which abnormal conditions are associated with the characteristic(s) (feature(s)) with respect to abnormal condition(s). When the information from the information acquisition part 11 is information captured by the camera 40 (the display device 70 with a camera), the abnormal condition monitoring part 18 may detect abnormal condition(s) by performing image analysis on the information to identify the feature(s) related to abnormal condition(s) and extracting the abnormal condition(s) corresponding to the extracted feature(s). Further, when the information from the information acquisition part 11 is obtained from the sensor 50 or the facility 60, the abnormal condition monitoring part 18 may detect abnormal condition(s) on the basis of the information related to abnormal condition(s) included therein. The abnormal condition monitoring part 18 outputs information that includes information related to the detected abnormal condition(s) to the information sorting part 19. The information outputted by the abnormal condition monitoring part 18 may include the time information and the source information included in the information from the information acquisition part 11.

Here, examples of abnormal conditions include abnormal conditions of individual livestock such as fights between animals, tail biting, sham chewing, falling, injuries, wounds, fractures, illness, diarrhea, prolonged lying down, and prolonged activity: abnormal conditions on site such as the intrusion of wild animals, severe weather, contamination from waste, land subsidence, and landslides: abnormal conditions of the camera 40, the sensor 50, and the facility 60 such as breakage, malfunction, and failure: free-range livestock that do not align with animal welfare principles; and abnormal condition(s) at the farming site 2.

The information sorting part 19 is a functional part that sorts the information from the individual identification part 12, the location identification part 13, the health status grasping part 14, the farming condition grasping part 15, the environmental condition grasping part 16, the AW condition grasping part 17, and the abnormal condition monitoring part 18 to store the information in the information storage part 20 (refer to FIG. 3). The information sorting part 19 classifies the information into one related to the individual identification information and one related to the location identification information on the basis of the time information and the source information included in the information acquired from the individual identification part 12, the location identification part 13, the health status grasping part 14, the farming condition grasping part 15, the environmental condition grasping part 16, the AW condition grasping part 17, and the abnormal condition monitoring part 18, sorts the information so as to associate (link) the individual identification information and the location identification information with (to) the information from the health status grasping part 14, the farming condition grasping part 15, the environmental condition grasping part 16, the AW condition grasping part 17, and the abnormal condition monitoring part 18, and stores results in the information storage part 20.

The information storage part 20 is a functional part that stores information (refer to FIG. 3). The information storage part 20 classifies and stores the information from the information sorting part 19 into individual information 20*a* related to the individual identification information and site information 20*b* related to the location identification information according to the information sorting performed by the information sorting part 19. In FIG. 3, the information storage part 20 is provided within the free-range livestock management server apparatus 10, but it may also be provided in a cloud. The information storage part 20 is able to centrally manage the stored information and provide it to the facility control part 21, the urgency determination part 22, and the information providing part 24.

The individual information 20*a* is information in which characteristics related to livestock are organized for each individual animal (refer to FIGS. 3 and 4). In the individual information 20*a*, information related to an individual animal is associated with each other for each individual identification information (animal ID in FIG. 4). Examples of the information related to an individual animal include the name of the animal (for instance, Hanako), age (in months), temperament, fighting history, weight, number of pregnancies (number of offspring), vaccination history, food intake of the day, last meal, water intakes, stall use, free space use, pasture use, outdoor playground use, health status, and free-range livestock biological indices used in the animal welfare assessment (for instance, animal-based information such as body condition score (BCS), cleanliness, hock condition, broken tails, docked tails, hoof condition etc.) as shown in FIG. 4. Additionally, information unique to free-range farming (such as information detailing when, where and what the animals were doing) may also be included.

The site information 20*b* is information in which characteristics related to the farming site (2 in FIG. 2) are organized for each location (refer to FIGS. 3 and 5). In the site information 20*b*, information related to a location is associated with each other for each location identification information (location ID in FIG. 5). Examples of the information related to a location include IDs and number of animals in an area, various types of information related to farming conditions (food, water, density, conditions, etc.), various types of information related to environmental conditions (weather, temperature, humidity, accumulation of waste, etc.), and various types of information related to conditions of the farming site 2 that are in line with animal welfare principles (for instance, facility-based information such as number of water troughs and their water supply capacity, heat countermeasures, indoor illuminance, and air quality, and management-based information such as amount of concentrated feed given, cleanliness of feed troughs, cleanliness of water troughs, etc.) as shown in FIG. 5. Additionally, information related to the camera 40, the sensor 50, the facility 60, and the display device 70 installed in an area, information detailing how often which animal used/stayed where for what purpose, information unique to free-range farming (such as information detailing when, where and what animals were doing, information related to animal welfare assessment targets, etc.) may also be included.

The facility control part 21 is a functional part that controls the facility 60 when the information related to abnormal condition(s) in the information storage part 20 corresponds to a preset condition(s) (refer to FIG. 3). Examples of the preset conditions include the water level in the water source being below a threshold, feed amount in the feeding area being below the threshold, and temperature or humidity being above (or below) the threshold. For instance, the facility control part 21 may control a water supply system when water in a water source is insufficient, control the feed supply system when the feed in the feeding area is insufficient, and control the air conditioning system to maintain livestock health when the temperature or humidity is too high or too low.

The urgency determination part 22 is a functional part that determines urgency of the information related to abnormal condition(s) stored in the information storage part 20 on the basis of a preset criterion (or criteria) (refer to FIG. 3). For instance, the preset criterion may dictate that there is urgency when a feature(s) (for instance, frequency, level, points, degree, etc.) in the information related to abnormal condition(s) stored in the information storage part 20 exceeds a threshold (or falls below the threshold, depending on the type of feature). When the information storage part 20 has a plurality of pieces of information related to abnormal conditions (things that require attention, such as ongoing fighting, high waste accumulation, feed shortage, water shortage, bad weather, high temperature, low temperature, high humidity, etc.), the urgency determination part 22 may determine urgency on the basis of preset priorities according to the type of abnormal condition information. Further, when the information storage part 20 has a plurality of pieces of information related to the same type of abnormal conditions, the urgency determination part 22 may determine urgency on the basis of preset priority (or priorities) according to a feature (for instance, frequency, level, points, degree, etc.) in other types of information (for instance, fighting history, injuries, health status, farming conditions, environmental conditions) stored in the information storage part 20. For instance, when the information related to abnormal condition(s) indicate fighting, bad weather, and high waste accumulation, the highest priority may be given to fighting, which has a large impact on the health of livestock, followed by bad weather, which also has an impact on the health of livestock, with a lowest priority assigned to high waste accumulation, which has a weaker impact on livestock. The urgency determination part 22 outputs its determination result (prioritized abnormal condition information) to the notification part 23. The urgency determination part 22 remains inactive when there is no information related to abnormal condition(s), and if there is only one piece of information related to an abnormal condition, it outputs the information related to the abnormal condition to the notification part 23 without determining the urgency thereof.

The notification part 23 is a functional part that creates notification information on the basis of the result of the determination by the urgency determination part 22 and transmits it to a predetermined mobile terminal(s) 30 or display device(s) 70 (refer to FIG. 3). The notification part 23 may transmit the created notification information to an information terminal (not shown) of an authorized individual (such as a veterinarian). The notification information may include text-based details such as individual identifier, location(s), condition(s), countermeasure, instruction, priority level(s), etc., and an image, and it may also be accompanied by an alarm sound. This allows the worker to refer to the notification information displayed on the mobile terminal(s) 30 or the display device(s) 70, check the condition(s) of the livestock and the location(s), and take an optimal measure(s) or make improvement(s). For instance, the notification information may include the following: Priority 1—an instruction to address a conflict between an individual animal ID4 and an individual animal ID5 at a location FA2: Priority 2—an instruction to move an individual animal ID 7 in a location P1 to a stall; and Priority 3—an instruction to clean a location FA4. After the tasks are executed according to instructions, a report is transmitted from the mobile terminal 30 or the display device 70 (equipped with an input function) to the information acquisition part 11 of the free-range livestock management server apparatus 10.

The information providing part 24 is a functional part that provides the information in the information storage part 20 to the mobile terminal 30, the display device 70, and the management terminal 80 in response to a request from the mobile terminal 30, the display device 70, and the management terminal 80 (refer to FIG. 3). The information providing part 24 may provide the information in the information storage part 20 to an information terminal (not shown) of an authorized individual (such as a veterinarian) in response to a request therefrom.

The mobile terminal 30 is an information communication terminal carried by a worker (refer to FIG. 1). FIG. 1 shows a plurality of the mobile terminals 30, but there may be only one mobile terminal. The mobile terminal 30 is connected to the free-range livestock management server apparatus 10 via the network 90 so as to be able to perform wireless or wired communication therewith. The mobile terminal 30 may be a portable terminal (computer terminal) comprising functional parts that configure a computer (for instance, a processor, a storage device, an input device, a communication interface, and a display device), and may be, for instance, a tablet terminal or a smartphone. The mobile terminal 30 may comprise a camera or a sensor. The mobile terminal 30 is able to transmit information entered or acquired through operation of a worker (for instance, information that cannot be automatically collected or completion information for an action instruction) to the free-range livestock management server apparatus 10. The mobile terminal 30 is able to receive and display or audibly output notification information and an alarm from the free-range livestock management server apparatus 10. The mobile terminal 30 can be operated by a worker to acquire and display information (for instance, individual information 20*a* and site information 20*b* in FIG. 3) from the free-range livestock management server apparatus 10 on request. Further, when the mobile terminal 30 comprises a camera or a sensor, it may transmit image information of an individual animal, at which the camera or the sensor is pointed, to the free-range livestock management server apparatus 10, acquire information on the animal from the management server 10 and display it as text or AR (Augmented Reality).

The camera 40 is a functional part that photographs an object to be photographed (for instance, livestock, a site, health status, farming condition(s), environmental condition(s), abnormal condition, etc.) (refer to FIG. 1). As the camera 40, for instance, an RGB (Red-Green-Blue) camera, a hyperspectral camera, a thermal camera, and the like may be used. The camera 40 is connected to the free-range livestock management server apparatus 10 via the network 90 so as to be able to perform wireless or wired communication therewith. The camera 40 transmits captured image data (for instance, images of livestock or on-site images, etc.) to the free-range livestock management server apparatus 10. The camera(s) 40 may be installed at a predetermined location(s) of the farming site 2. The camera 40 may be a camera mounted on a moving object such as a drone or a robot (for instance, refer to 30 (C4) in FIG. 2). The camera 40 may not only be a dedicated camera device, but also a camera mounted on the mobile terminal 30, the facility 60, or the display device 70.

The sensor 50 is a functional part that detects an object to be photographed (for instance, livestock, a site, health status, farming condition, environmental condition, abnormal condition, etc.) (refer to FIG. 1). As the sensor 50, for instance, an RFID (Radio Frequency Identifier), a temperature sensor, a humidity sensor, a photosensor, a wattmeter, a flow meter, a LIDAR (Light Detection And Ranging), and a 3D sensor may be used. The sensor 50 is connected to the free-range livestock management server apparatus 10 via the network 90 so as to be able to perform wireless or wired communication therewith. The sensor 50 transmits detected information (for instance, stall indoor temperature, outdoor temperature, humidity, illuminance, power consumption, water consumption, gas consumption, distance, 3D data, etc.) to the free-range livestock management server apparatus 10. The sensor 50 may be installed at a predetermined location(s) of the farming site 2. The sensor 50 may be a sensor mounted on a moving object such as a drone or a robot (for instance, refer to 50 (S4) in FIG. 2). The sensor 50 may not only be a dedicated sensor device, but also a sensor mounted on the mobile terminal 30, the facility 60, or the display device 70.

The facility 60 is equipment that supports operation of the farming site 2 (refer to FIG. 1). As the facility 60, for instance, feed supply equipment, water supply equipment, air conditioning equipment, and a gate apparatus (doors at the entrances and exits of the free access stalls) may be used. The facility 60 may be installed at a predetermined location of the farming site (2 in FIG. 2). The facility 60 is connected to the free-range livestock management server apparatus 10 via the network 90 so as to be able to perform wireless or wired communication therewith. The facility 60 may comprise a camera or a sensor. The facility 60 is controlled by the facility control part 21 of the free-range livestock management server apparatus 10. The facility 60 transmits operational information to the free-range livestock management server apparatus 10.

The display device 70 is a device that displays information (refer to FIG. 1). As the display device 70, for instance, a liquid crystal display, an OELD (Organic Electro-Luminescence Diode) display, a tablet terminal, and a smartphone may be used. The display device 70 may be installed at a predetermined location of the farming site 2 (for instance, at every free access stall). The display device 70 is connected to the free-range livestock management server apparatus 10 via the network 90 so as to be able to perform wireless or wired communication therewith. The display device 70 may comprise a camera, a sensor, or an input part (such as a touch panel, a gesture sensor, a non-contact input device, and the like). The display device 70 displays information provided by the free-range livestock management server apparatus 10. For instance, the displayed information may be information related to the location where the display device 70 is installed or to an individual animal at the location. The display device 70 may photograph an individual animal present in the location where the display device 70 is installed, transmit the image information to the free-range livestock management server apparatus 10, and obtain information about the individual animal from the management server apparatus 10 to display the obtained information. The display device 70 may comprise functionality of requesting information from the free-range livestock management server apparatus 10 through operation of a worker, obtaining the information from the free-range livestock management server apparatus 10, and displaying the obtained information. When receiving notification information from the free-range livestock management server apparatus 10, the display device 70 displays the notification information. The display device 70 prioritizes and displays the notification information over the currently displayed information. The display device 70 may comprise functionality of transmitting information entered through operation of a worker (for instance, information that cannot be automatically collected or completion information for an action instruction) to the free-range livestock management server apparatus 10. The display device 70 may comprise functionality of transmitting information such as an image, a detection, and a measurement to the free-range livestock management server apparatus 10 each time an individual animal enters the free-access stall.

The management terminal 80 is a terminal used by an administrator of the free-range livestock management server apparatus 10 (refer to FIG. 1). The management terminal 80 is connected to the free-range livestock management server apparatus 10 via the network 90 so as to be able to perform wireless or wired communication therewith. The management terminal 80 may be a terminal (computer terminal) comprising functional parts that configure a computer (for instance, a processor, a storage device, an input device, a communication interface, and a display device), and may be, for instance, a personal computer, a server, a tablet terminal or a smartphone. The management terminal 80 can be operated by an administrator to manage (input, create, delete, add, change, edit, etc.) information in the free-range livestock management server apparatus 10. There may be more than one management terminal 80.

The network 90 is a communication network that provides communication (wireless or wired communication) between the free-range livestock management server apparatus 10, the mobile terminal 30, the camera 40, the sensor 50, the facility 60, the display device 70, and the management terminal 80 (refer to FIG. 1). The network 90 may be, for instance, a communication network such as a local area network (LAN), a personal area network (PAN), a metropolitan area network (MAN), a wide area network (WAN), or a global area network (GAN).

Figure 6:
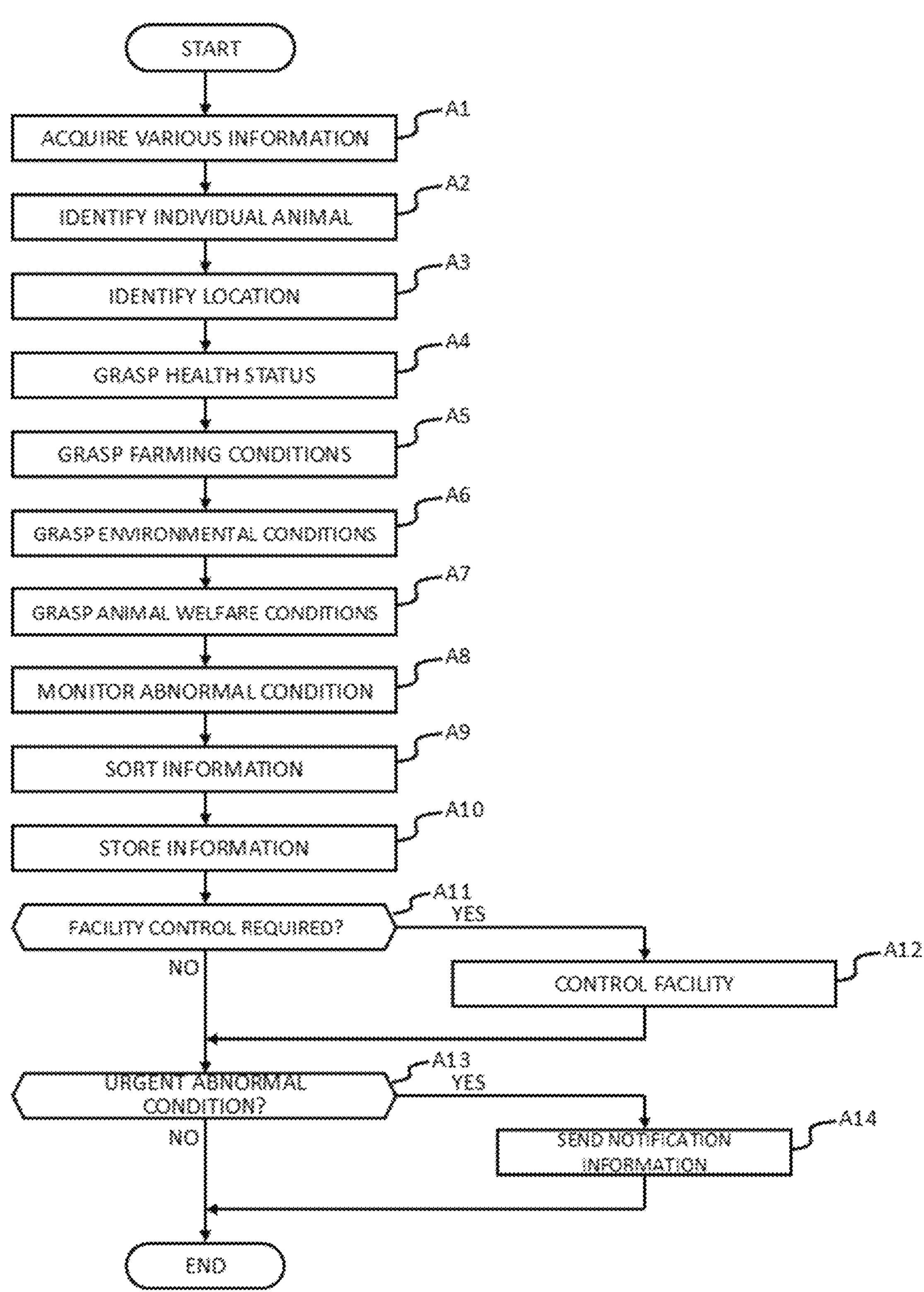
FIG. 6 is a flowchart schematically showing an operation of the free-range livestock management server apparatus in the free-range livestock management system relating to Example Embodiment 1.

The following describes operation of the free-range livestock management server apparatus in the free-range livestock management system relating to Example Embodiment 1 with reference to the drawings. FIG. 6 is a flowchart schematically showing the operation of the free-range livestock management server apparatus in the free-range livestock management system relating to Example Embodiment 1. Refer to FIGS. 1 to 3 for the configuration of the free-range livestock management system.

First, the free-range livestock management server apparatus 10 acquires various types of information from any one or all of the mobile terminal 30, the camera 40, the sensor 50, the facility 60, the display device 70, and the management terminal 80 (step A1).

Next, the free-range livestock management server apparatus 10 identifies an individual animal on the basis of the acquired information (step A2). When the acquired information does not include information related to an individual animal, the step A2 is skipped.

Next, the free-range livestock management server apparatus 10 identifies a location at the farming site 2 on the basis of the acquired information (step A3). When the acquired information does not include information related to a location, the step A3 is skipped.

Next, the free-range livestock management server apparatus 10 grasps the health status of an animal on the basis of the acquired information (step A4). When the acquired information does not include information related to a health status of an animal, the step A4 is skipped.

Next, the free-range livestock management server apparatus 10 grasps farming conditions at the farming site 2 on the basis of the acquired information (step A5). When the acquired information does not include information related to a farming condition(s) at the farming site 2, the step A5 is skipped.

Next, the free-range livestock management server apparatus 10 grasps environmental condition(s) at the farming site 2 on the basis of the acquired information (step A6). When the acquired information does not include information related to environmental conditions at the farming site 2, the step A6 is skipped.

Next, the free-range livestock management server apparatus 10 grasps the animal welfare condition(s) of the livestock or the farming site 2 on the basis of the acquired information (step A7). When the acquired information does not include information related to the animal welfare conditions of the livestock or at the farming site 2, the step A7 is skipped.

Next, the free-range livestock management server apparatus 10 monitors an abnormal condition of the livestock or at the farming site 2 on the basis of the acquired information (step A8). When the acquired information does not include information related to an abnormal condition of the livestock or at the farming site 2, the step A8 is skipped.

Next, the free-range livestock management server apparatus 10 sorts (classifies and associates) the information obtained in the steps A2 to A8 (step A9).

Next, the free-range livestock management server apparatus 10 stores the sorted information (step A10).

Next, the free-range livestock management server apparatus 10 determines whether or not the stored information contains any information related to an abnormal condition at the farming site 2 that requires facility control (step A11).

If there is information related to a facility control requirement (YES in the step A11), the free-range livestock management server apparatus 10 controls the facility 60 on the basis of the stored information (step A12).

If there is no information related to a facility control requirement (NO in the step A11) or after the step A12, the free-range livestock management server apparatus 10 determines urgency of an abnormal condition in the stored information (step A13). If there is no urgent abnormal condition (NO in the step A13), the operation terminates.

If there is an urgent abnormal condition (YES in the step A13), the free-range livestock management server apparatus 10 creates notification information on the basis of the information related to the abnormal condition, transmits the notification information to a predetermined mobile terminal 30 or display device 70 (step A14), and then terminates the operation. Further, when receiving the notification information, the mobile terminal 30 or the display device 70 displays the notification information. A worker refers to the notification information, goes to the site, and takes action to deal with the abnormal condition. Then, the worker enters action completion information into the mobile terminal 30 or the display device 70 and transmits the information to the free-range livestock management server apparatus 10.

The following describes an operation of the free-range livestock management system relating to Example Embodiment 1 with reference to the drawings. FIG. 7 is a sequence chart schematically showing the operation of the free-range livestock management system relating to Example Embodiment 1. Refer to FIGS. 1 to 3 for the configuration of the free-range livestock management system.

First, the mobile terminal 30 transmits input information entered through operation of a worker to the free-range livestock management server apparatus 10 as necessary (step B1).

Next, the camera 40 periodically transmits photographed image information to the free-range livestock management server apparatus 10 (step B2).

Next, the sensor 50 periodically transmits detected sensor information to the free-range livestock management server apparatus 10 (step B3).

Next, the facility 60 transmits operational information to the free-range livestock management server apparatus 10 as necessary (step B4). Note that the order of the steps B1 to B4 may be changed. Further, the information transmitted to the free-range livestock management server apparatus 10 may include information transmitted by the display device 70 and the management terminal 80, in addition to the information transmitted in the steps B1 to B4.

Next, the free-range livestock management server apparatus 10 acquires various types of information from any one or all of the mobile terminal 30, the camera 40, the sensor 50, the facility 60, the display device 70, and the management terminal 80 (step B5).

Next, the free-range livestock management server apparatus 10 identifies an individual animal on the basis of the acquired information (step B6). When the acquired information does not include information related to an individual animal, the step B6 is skipped.

Next, the free-range livestock management server apparatus 10 identifies a location at the farming site 2 on the basis of the acquired information (step B7). When the acquired information does not include information related to a location, the step B7 is skipped.

Next, the free-range livestock management server apparatus 10 grasps various conditions (any one or all of the health status of an animal, farming conditions at the farming site 2, environmental conditions at the farming site 2, and the animal welfare conditions of the livestock or the farming site 2) on the basis of the acquired information (step B8). When the acquired information does not include information related to these conditions, the step B8 is skipped.

Next, the free-range livestock management server apparatus 10 monitors an abnormal condition of the livestock or the farming site 2 on the basis of the acquired information (step B9). When the acquired information does not include information related to an abnormal condition of the livestock or at the farming site 2, the step B9 is skipped.

Next, the free-range livestock management server apparatus 10 sorts (classifies and associates) the information obtained in the steps B6 to B9 (step B10).

Next, the free-range livestock management server apparatus 10 stores the sorted information (step B11).

Next, if the stored information contains information related to an abnormal condition at the farming site 2 that requires facility control, the free-range livestock management server apparatus 10 generates control information that controls the facility 60 on the basis of the stored information and transmits the control information to the facility 60 (step B12). If there is no information related to a facility control requirement, the step B12 is skipped.

Next, when receiving the control information from the free-range livestock management server apparatus 10, the facility 60 controls itself on the basis of the control information (step B13).

Next, if there is an urgent abnormal condition in the stored information, the free-range livestock management server apparatus 10 creates the notification information on the basis of the information related to the abnormal condition and transmits the notification information to a predetermined mobile terminal 30 or display device 70 (step B14). If there is no urgent abnormal condition, the step B14 is skipped.

Next, when receiving the notification information from the free-range livestock management server apparatus 10, the mobile terminal 30 displays the notification information (step B15). A worker refers to the notification information, goes to the site, and takes action to deal with the abnormal condition. Then, the worker enters action completion information into the mobile terminal 30 and transmits the information to the free-range livestock management server apparatus 10. If no notification information is received from the free-range livestock management server apparatus 10, the step B15 is skipped.

Next, when receiving the notification information from the free-range livestock management server apparatus 10, the display device 70 displays the notification information (step B16), and then the operation terminates. A worker refers to the notification information and takes action to deal with the abnormal condition. Then, the worker enters action completion information into the display device 70 and transmits the information to the free-range livestock management server apparatus 10. If no notification information is received from the free-range livestock management server apparatus 10, the step B16 is skipped.

According to Example Embodiment 1, the free-range livestock management server apparatus 10 can contribute to grasping the conditions of free-range livestock and the farming site 2 and identifying any abnormal condition deviating therefrom since it collects various information to monitor the abnormal condition of the livestock and at the farming site 2.

Further, according to Example Embodiment 1, since the free-range livestock management server apparatus 10 transmits the notification information that identifies and notifies a detected abnormal condition to the mobile terminal 30 or the display device 70 of a worker and has the notification information displayed thereon, the worker can perform his or her task with guidance and support from the displayed notification information, improving the operational efficiency at the farming site 2. In other words, this reduces reliance on memory and know-how, contributing to elimination of errors in the work process. As a result, a shift from time-based maintenance (TBM) to condition-based maintenance (CBM) can be realized to optimize the workers' tasks.

Further, according to Example Embodiment 1, since the free-range livestock management server apparatus 10 determines the urgency (priority) of a plurality of abnormal conditions detected simultaneously, the order of responses to the abnormal conditions can be optimized.

Further, according to Example Embodiment 1, the automatic information collection via the camera 40 and sensor 50 reduces efforts required for gathering and recording necessary information, thereby contributing to a decrease in the worker's workload.

Further, according to Example Embodiment 1, the management of free-range livestock by the free-range livestock management server apparatus 10 leads to a realization of the Five Freedoms of animal welfare (freedom from hunger and thirst: freedom from discomfort; freedom from pain, injury, and disease: freedom to act in inherent behavior; and freedom from fear and distress).

Further, according to Example Embodiment 1, the management of free-range livestock by the free-range livestock management server apparatus 10 can provide an optimal growth environment for the livestock and offer operational efficiency in free-range farming that is comparable to that of stall farming.

Further, according to Example Embodiment 1, since individual animals can be identified non-contactively by using the camera 40 and the sensor 50, painful identification marks such as ear notching or branding become unnecessary, thereby maintaining a high comfort level for the livestock.

Further, according to Example Embodiment 1, since a worker can use the mobile terminal 30 to check various conditions of the farming site 2 and livestock and enter the information in real time anytime and anywhere, the worker can manage freely roaming animals individually, grasp (know) their behavior, and make necessary countermeasure decisions swiftly without standing at the farming site 2, thus improving the operational efficiency and productivity.

Further, according to Example Embodiment 1, since a worker is able to remotely check various conditions of the farming site 2 and livestock using the mobile terminal 30, the frequency of workers entering the farming site 2 is reduced and this serves as a preventive measure against livestock infectious diseases.

Further, according to Example Embodiment 1, by using the mobile terminal 30 to refer to his or her daily tasks, a worker can change his or her working manner to visiting the farming site 2 only when necessary, reducing his or her workload and optimizing operations.

Example Embodiment 2

Figure 8:
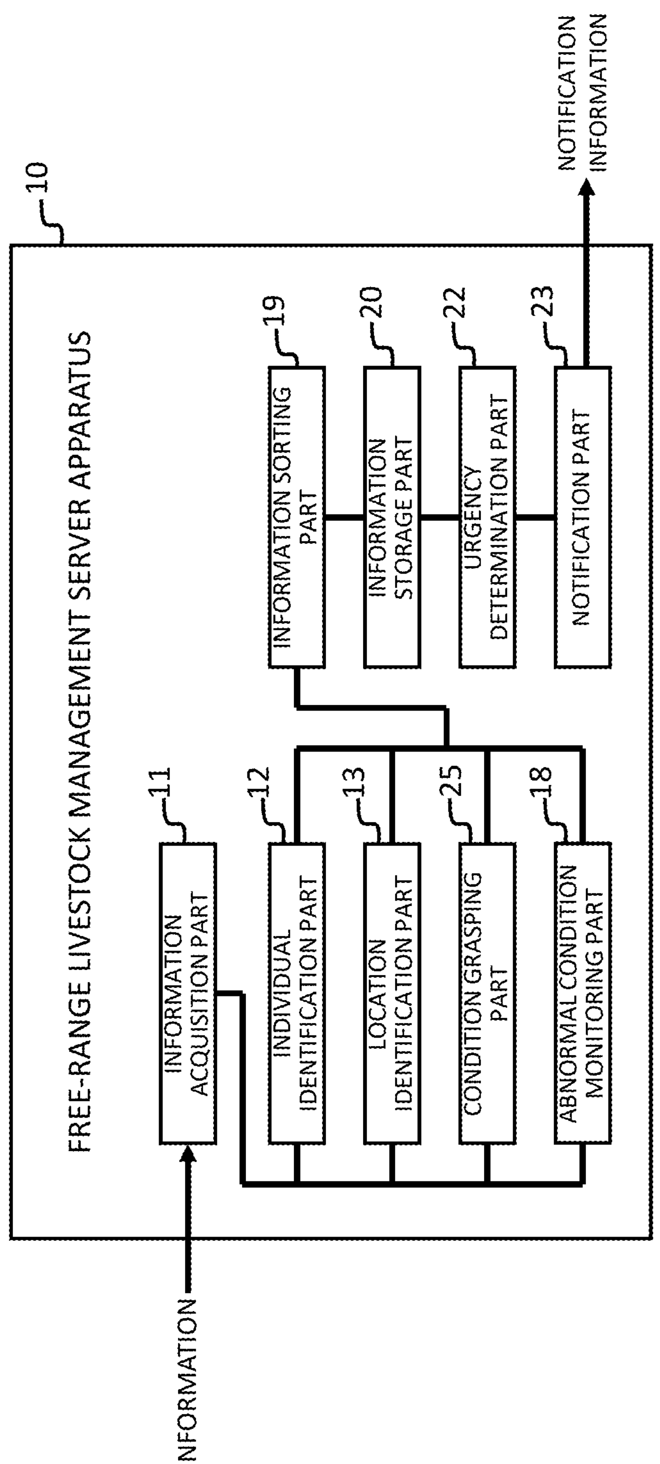
FIG. 8 is a block diagram schematically illustrating a configuration of a free-range livestock management server apparatus relating to Example Embodiment 2.

The following describes a free-range livestock management server apparatus relating to Example Embodiment 2 with reference to a drawing. FIG. 8 is a block diagram schematically illustrating a configuration of the free-range livestock management server apparatus relating to Example Embodiment 2.

The free-range livestock management server apparatus 10 is a server apparatus that manages information regarding free-range livestock and a farming site. The free-range livestock management server apparatus 10 comprises an information acquisition part 11, an individual identification part 12, a location identification part 13, a condition grasping part 25, a abnormal condition monitoring part 18, an information sorting part 19, an information storage part 20, an urgency determination part 22, and a notification part 23.

The information acquisition part 11 is configured to acquire information related to an individual animal or a location at a farming site from an external source. The individual identification part 12 is configured to identify individual animal on the basis of the acquired information. The location identification part 13 is configured to identify the location on the basis of the acquired information. The condition grasping part 25 is configured to grasp a condition of the individual animal or the location on the basis of the acquired information. The abnormal condition monitoring part 18 is configured to monitor an abnormal condition of the individual animal or the location on the basis of the acquired information. The information sorting part 19 is configured to sort each piece of the information obtained by the individual identification part 12, the location identification part 13, the condition grasping part 25, and the abnormal condition monitoring part 18 for the identified individual animal or the identified location and associate each piece of the information with the identified individual animal or the identified location. The information storage part 20 is configured to store the information sorted for and associated with the individual animal or the location. The urgency determination part 22 is configured to determine urgency of information related to the abnormal condition of the individual animal or at the location among the stored information on the basis of a preset criterion (or criteria). The notification part 23 is configured to create notification information on the basis of the information determined to be urgent and transmit the notification information to a predetermined terminal(s).

According to Example Embodiment 2, the free-range livestock management server apparatus 10 can contribute to identifying any abnormal condition of free-range livestock and at a farming site since it collects various pieces of information to monitor an abnormal condition of the individual animals and locations in the farming site.

Figure 9:
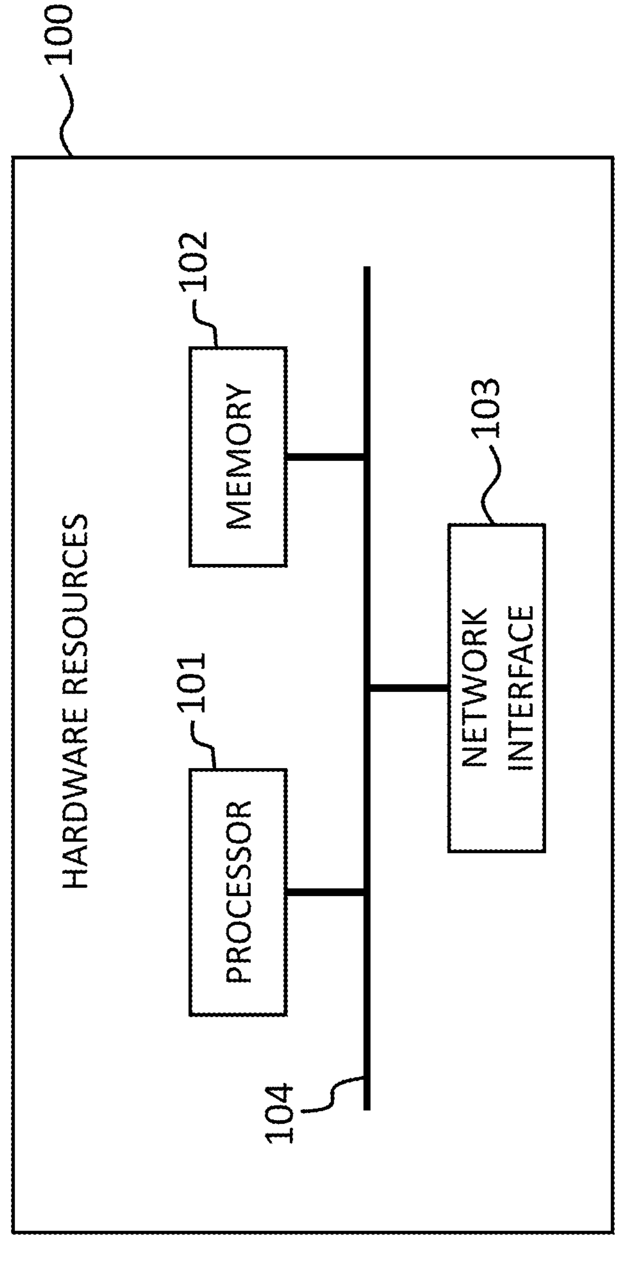
FIG. 9 is a block diagram schematically illustrating a configuration of hardware resources.

Further, the free-range livestock management server apparatus relating to Example Embodiments 1 and 2 can be configured by so-called hardware resources (information processing apparatus, computer) and may employ a configuration illustrated in FIG. 9. For instance, hardware resources 100 comprise a processor 101, a memory 102, and a network interface 103, which are connected to each other by an internal bus 104.

Note that the configuration shown in FIG. 9 is not intended to limit the hardware configuration of the hardware resources 100. The hardware resources 100 may include hardware not shown in the drawing (for instance, an input/output interface). In addition, the number of units such as the processor 101 included in the apparatus is not limited to the example shown in FIG. 9: for instance, a plurality of the processors 101 may be included in the hardware resources 100. As the processor 101, for instance, a CPU (Central Processing Unit), an MPU (Micro Processor Unit), a GPU (Graphics Processing Unit), and the like may be used.

As the memory 102, for instance, a RAM (Random Access Memory), a ROM (Read-Only Memory), an HDD (Hard Disk Drive), an SSD (Solid State Drive), and the like may be used.

As the network interface 103, for instance, a LAN (Local Area Network) card, a network adaptor, a network interface card, and the like may be used.

The functions of the hardware resources 100 are achieved by the processing modules described above. These processing modules are realized by, for instance, having the processor 101 execute a program stored in the memory 102. Further, the program can be downloaded via a network or can be updated using a storage medium storing the program. In addition, the processing modules may be realized by a semiconductor chip. In other words, the functions performed by the processing modules may be realized by running software on some kind of hardware.

Some or all of the example embodiments above can be described as (but not limited to) the following Supplementary Notes.

[Supplementary Note 1]

A free-range livestock management server apparatus, comprising:

an information acquisition part configured to acquire information related to an individual animal or a location at a farming site from an external source;

an individual identification part configured to identify the individual animal on the basis of the acquired information;

a location identification part configured to identify the location on the basis of the acquired information;

a condition grasping part configured to grasp a condition (s) of the individual animal or the location on the basis of the acquired information;

an abnormal condition monitoring part configured to monitor an abnormal condition of the individual animal or the location on the basis of the acquired information;

an information sorting part configured to sort each piece of the information obtained by the individual identification part, the location identification part, the condition grasping part, and the abnormal condition monitoring part for the identified individual animal or the identified location and associate each piece of the information with the identified individual animal or the identified location;

an information storage part configured to store the information sorted for and associated with the individual animal or the location;

an urgency determination part configured to determine urgency of information related to the abnormal condition of the individual animal or the location among the stored information on the basis of a preset criterion; and a notification part configured to create notification information on the basis of the information determined to be urgent and transmit the notification information to a predetermined terminal(s).

[Supplementary Note 2]

The free-range livestock management server apparatus according to Supplementary Note 1, wherein when the information determined to be urgent includes information related to one of the locations where a display device(s) is/are installed, the notification part is configured to transmit the notification information to the display device(s).

[Supplementary Note 3]

The free-range livestock management server apparatus according to Supplementary Note 1 or 2, wherein the condition grasping part comprises:

a health status grasping part configured to grasp the health status of the individual animal on the basis of the acquired information;

a farming condition grasping part configured to grasp farming conditions of the location on the basis of the acquired information;

an environmental condition grasping part configured to grasp environmental conditions of the location on the basis of the acquired information; and an animal welfare condition grasping part configured to grasp animal welfare conditions of the individual animal or the location on the basis of the acquired information.

[Supplementary Note 4]

The free-range livestock management server apparatus according to any one of Supplementary Notes 1 to 3, further comprising a facility control part that controls a facility when information related to the abnormal condition of the location among the stored information corresponds to a preset condition.

[Supplementary Note 5]

The free-range livestock management server apparatus according to Supplementary Note 1, wherein the external source includes any one or all of a camera(s) installed at a predetermined location, a sensor(s) installed at a predetermined location, a terminal(s), a management terminal that manages the free-range livestock management server apparatus, a facility (facilities), and a display device(s).

[Supplementary Note 6]

The free-range livestock management server apparatus according to Supplementary Note 1, further comprising an information providing part configured to provide information stored in the information storage part to the terminal, a management terminal that manages the free-range livestock management server apparatus, or a display device(s) in response to a request from the terminal(s), the management terminal, or the display device(s).

[Supplementary Note 7]

The free-range livestock management server apparatus according to any one of Supplementary Notes 1 to 6, wherein the individual identification part is configured to analyze the acquired information to extract a feature(s) of the individual animal and refer to preset information related to a feature(s) of the individual animal to identify the individual animal.

[Supplementary Note 8]

The free-range livestock management server apparatus according to any one of Supplementary Notes 1 to 7, wherein the location identification part is configured to analyze the acquired information to extract a feature(s) of the location and refer to preset information related to a feature(s) of the location to identify the location.

[Supplementary Note 9]

The free-range livestock management server apparatus according to any one of Supplementary Notes 1 to 8, wherein the condition grasping part is configured to analyze the acquired information to extract a feature(s) of the condition(s) and refer to preset information related to a feature(s) of the condition(s) to grasp the condition(s).

[Supplementary Note 10]

The free-range livestock management server apparatus according to any one of Supplementary Notes 1 to 9, wherein the abnormal condition monitoring part is configured to analyze the acquired information to extract a feature(s) of the abnormal condition and refer to preset information related to a feature of the abnormal condition to monitor the abnormal condition.

[Supplementary Note 11]

A free-range livestock management system, comprising:

the free-range livestock management server apparatus according to any one of Supplementary Notes 1 to 10;

a camera(s) installed at a predetermined location(s) of a farming site and communicatively connected to the free-range livestock management server apparatus;

a sensor(s) installed at a predetermined location(s) of the farming site and communicatively connected to the free-range livestock management server apparatus; and a terminal(s) communicatively connected to the free-range livestock management server apparatus.

[Supplementary Note 12]

A free-range livestock management method for managing information related to free-range livestock and a farming site using hardware resources, the free-range livestock management method including:

a step of acquiring information related to an individual animal or a location at a farming site from an external source;

a step of identifying the individual animal on the basis of the acquired information;

a step of identifying the location on the basis of the acquired information;

a step of grasping a condition(s) of the individual animal or the location on the basis of the acquired information;

a step of monitoring an abnormal condition of the individual animal or at the location on the basis of the acquired information;

a step of sorting each piece of the information related to the identified individual animal, the identified location, the grasped condition, and the monitored abnormal condition for the identified individual animal or the identified location and associating each piece of the information with the identified individual animal or the identified location;

a step of storing the information sorted for and associated with the individual animal or the location;

a step of determining urgency of information related to the abnormal condition of the individual animal or at the location among the stored information on the basis of a preset criterion (or criteria); and a step of creating notification information on the basis of the information determined to be urgent and transmitting the notification information to a predetermined terminal(s).

[Supplementary Note 13]

A program causing hardware resources to execute a process of managing information related to free-range livestock and a farming site, the program causing the hardware resources to execute:

a process of acquiring information related to an individual animal or a location at a farming site from an external source;

a process of identifying the individual animal on the basis of the acquired information;

a process of identifying the location on the basis of the acquired information;

a process of grasping a condition(s) of the individual animal or the location on the basis of the acquired information;

a process of monitoring an abnormal condition of the individual animal or at the location on the basis of the acquired information;

a process of sorting each piece of the information related to the identified individual animal, the identified location, the grasped condition(s), and the monitored abnormal condition for the identified individual animal or the identified location and associating each piece of the information with the identified individual animal or the identified location;

a process of storing the information sorted for and associated with the individual animal or the location;

a process of determining urgency of information related to the abnormal condition of the individual animal or at the location among the stored information on the basis of a preset criterion (or criteria); and a process of creating notification information on the basis of the information determined to be urgent and transmitting the notification information to a predetermined terminal(s).

Further, the disclosure of each Patent Literature cited above is incorporated herein in its entirety by reference thereto and can be used as a basis or a part of the present invention as needed. It is to be noted that it is possible to modify or adjust the example embodiments or examples within the scope of the whole disclosure of the present invention (including the Claims and the figures) and based on the basic technical concept thereof. Further, it is possible to variously combine or select (or deselect if necessary) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims and the figures, and the technical concept of the present invention. Particularly, any numerical values or ranges disclosed herein should be interpreted that any intermediate or lower values or subranges falling within the disclosed ranges are also disclosed even without explicit recital thereof. In addition, using some or all of the disclosed elements in each literature cited above as necessary in combination with the elements described herein as part of the disclosure of the present invention in accordance with the object of the present invention shall be considered to be included in (or belong to) the disclosed elements of the present application.

REFERENCE SIGNS LIST

1: free-range livestock management system
2: farming site
10: free-range livestock management server apparatus
11: information acquisition part
12: individual identification part
13: location identification part
14: health status grasping part
15: farming condition grasping part
16: environmental condition grasping part
17: AW condition grasping part
18: abnormal condition monitoring part
19: information sorting part
20: information storage part
**20*a***: individual information
**20*b***: site information
21: facility control part
22: urgency determination part
23: notification part
24: information providing part
25: condition grasping part
30: mobile terminal

40: camera
50: sensor
60: facility
70: display device
80: management terminal
90: network
100: hardware resources
101: processor
102: memory
103: network interface
104: internal bus

The invention claimed is:

1. A free-range livestock management server apparatus, comprising:

a memory storing instructions; and at least one processor configured to execute the instructions to cause:

an information acquisition part to acquire, from an external source, information related to an individual livestock animal and information related to a location of a farming site;

an individual identification part to identify the individual livestock animal on the basis of the acquired information;

a location identification part to identify the location on the basis of the acquired information;

a condition grasping part to grasp a condition of the individual livestock animal and the location on the basis of the acquired information;

an abnormal condition monitoring part to monitor an abnormal condition of the individual livestock animal and the location on the basis of the acquired information;

an information organizing part to organize and associate pieces of information obtained by the individual identification part, the location identification part, the condition grasping part, and the abnormal condition monitoring part for each identified individual livestock animal and each identified location;

an information storage part to store the information organized and associated for each individual livestock animal and each location;

an urgency determination part to determine urgency of information related to the abnormal condition of the individual livestock animal or the location among the stored information on the basis of a preset criterion; and a notification part to create notification information on the basis of the information determined to be urgent and transmit the notification information to a predetermined terminal, wherein the farming site includes a free access stall provided with a swinging door through which the individual livestock animal can freely enter and exit, a free area in which the individual livestock animal can roam freely, a pasture, an outdoor playground, a barn, a feeding area, and an inspection passage, wherein each of the areas differs from one another in a degree of behavioral restriction imposed on the individual livestock animal or in a functional characteristic of the area, wherein the location identification part identifies, as the location, one of the respective areas in which the individual livestock animal is located, and wherein the condition grasping part grasps the condition of the individual livestock animal, and the abnormal condition monitoring part monitors the abnormal condition, in accordance with the degree of behavioral restriction or the functional characteristic of the identified area.

2. The free-range livestock management server apparatus according to claim 1, wherein the at least one processor is configured to execute the instructions to cause:

when the information determined to be urgent includes information related to one of the locations where a display device is installed, the notification part to transmit the notification information to the display device.

3. The free-range livestock management server apparatus according to claim 1, wherein the at least one processor is configured to execute the instructions to cause:

the condition grasping part to:

grasp a health status of the individual livestock animal on the basis of the acquired information;

grasp farming conditions of the location on the basis of the acquired information;

grasp environmental conditions of the location on the basis of the acquired information; and grasp animal welfare conditions of the individual livestock animal or the location on the basis of the acquired information.

4. The free-range livestock management server apparatus according to claim 1, wherein the at least one processor is configured to execute the instructions to cause a facility control part to control a facility when information related to the abnormal condition of the location among the stored information corresponds to a preset condition.

5. The free-range livestock management server apparatus according to claim 1, wherein the external source includes any one or all of a camera installed at a predetermined location, a sensor installed at a predetermined location, a terminal, a management terminal that manages the free-range livestock management server apparatus, a facility, and a display device.

6. The free-range livestock management server apparatus according to claim 1, wherein the at least one processor is configured to execute the instructions to cause:

an information providing part to provide information stored in the information storage part to the terminal, a management terminal that manages the free-range livestock management server apparatus, or a display device in response to a request from the terminal, the management terminal, or the display device.

7. The free-range livestock management server apparatus according to claim 1, wherein the at least one processor is configured to execute the instructions to cause:

the individual identification part to analyze the acquired information to extract a feature of the individual livestock animal and refer to preset information related to a feature of the individual livestock animal to identify the individual livestock animal.

8. The free-range livestock management server apparatus according to claim 1, wherein the at least one processor is configured to execute the instructions to cause:

the location identification part to analyze the acquired information to extract a feature of the location and refer to preset information related to a feature of the location to identify the location.

9. The free-range livestock management server apparatus according to claim 1, wherein the at least one processor is configured to execute the instructions to cause:

the condition grasping part to analyze the acquired information to extract a feature of the condition and refer to preset information related to a feature of the condition to grasp the condition.

10. The free-range livestock management server apparatus according to claim 1, wherein the at least one processor is configured to execute the instructions to cause:

the abnormal condition monitoring part to analyze the acquired information to extract a feature of the abnormal condition and refer to preset information related to a feature of the abnormal condition to monitor the abnormal condition.

11. A free-range livestock management system, comprising:

the free-range livestock management server apparatus according to claim 1;

a camera installed at a predetermined location of a farming site and communicatively connected to the free-range livestock management server apparatus;

a sensor installed at a predetermined location of the farming site and communicatively connected to the free-range livestock management server apparatus; and a terminal communicatively connected to the free-range livestock management server apparatus.

12. A free-range livestock management method for managing information related to free-range livestock and a farming site using hardware resources, the free-range livestock management method comprising:

acquiring, from an external source, information related to an individual livestock animal and information related to a location of a farming site;

identifying the individual livestock animal on the basis of the acquired information;

identifying the location on the basis of the acquired information;

grasping a condition of the individual livestock animal and the location on the basis of the acquired information;

monitoring an abnormal condition of the individual livestock animal and the location on the basis of the acquired information;

organizing and associating pieces of the information related to the identified individual livestock animal, the identified location, the grasped condition, and the monitored abnormal condition for each identified individual livestock animal and each identified location;

storing the information organized and associated for each individual livestock animal and each location;

determining urgency of information related to the abnormal condition of the individual livestock animal or the location among the stored information on the basis of a preset criterion; and creating notification information on the basis of the information determined to be urgent and transmitting the notification information to a predetermined terminal, wherein the farming site includes a free access stall provided with a swinging door through which the individual livestock animal can freely enter and exit, a free area in which the individual livestock animal can roam freely, a pasture, an outdoor playground, a barn, a feeding area, and an inspection passage, wherein each of the areas differs from one another in a degree of behavioral restriction imposed on the individual livestock animal or in a functional characteristic of the area, wherein the identifying the location comprises identifying, as the location, one of the respective areas in which the individual livestock animal is located, and wherein the condition of the individual livestock animal is grasped, and the abnormal condition is monitored, in accordance with the degree of behavioral restriction or the functional characteristic of the identified area.

13. The free-range livestock management method according to claim 12, wherein when the information determined to be urgent includes information related to one of the locations where a display device is installed, the notification information is transmitted to the display device.

14. The free-range livestock management method according to claim 12, wherein the condition grasping comprises:

health status grasping to grasp a health status of the individual livestock animal on the basis of the acquired information;

farming condition grasping to grasp farming conditions of the location on the basis of the acquired information;

environmental condition grasping to grasp environmental conditions of the location on the basis of the acquired information; and animal welfare condition grasping to grasp animal welfare conditions of the individual livestock animal or the location on the basis of the acquired information.

15. The free-range livestock management method according to claim 12, further comprising controlling a facility when information related to the abnormal condition of the location among the stored information corresponds to a preset condition.

16. The free-range livestock management method according to claim 12, wherein the external source includes any one or all of a camera installed at a predetermined location, a sensor installed at a predetermined location, a terminal, a management terminal that manages a free-range livestock management server apparatus, a facility, and a display device.

17. A computer readable non-transitory storage medium storing a program causing hardware resources to execute a process of managing information related to free-range livestock and a farming site, the program causing the hardware resources to execute:

a process of acquiring, from an external source, information related to an individual livestock animal and information related to a location of a farming site;

a process of identifying the individual livestock animal on the basis of the acquired information;

a process of identifying the location on the basis of the acquired information;

a process of grasping a condition of the individual livestock animal and the location on the basis of the acquired information;

a process of monitoring an abnormal condition of the individual livestock animal and the location on the basis of the acquired information;

a process of organizing and associating pieces of the information related to the identified individual livestock animal, the identified location, the grasped condition, and the monitored abnormal condition for each identified individual livestock animal and each identified location;

a process of storing the information organized and associated for each individual livestock animal and each location;

a process of determining urgency of information related to the abnormal condition of the individual livestock animal or the location among the stored information on the basis of a preset criterion; and a process of creating notification information on the basis of the information determined to be urgent and transmitting the notification information to a predetermined terminal, wherein the farming site includes a free access stall provided with a swinging door through which the individual livestock animal can freely enter and exit, a free area in which the individual livestock animal can roam freely, a pasture, an outdoor playground, a barn, a feeding area, and an inspection passage, wherein each of the areas differs from one another in a degree of behavioral restriction imposed on the individual livestock animal or in a functional characteristic of the area, wherein the process for identifying the location includes identifying, as the location, a respective area in which the individual livestock animal is located, and wherein the process of grasping the condition of the individual livestock animal, and the process of monitoring the abnormal condition, are executed in accordance with the degree of behavioral restriction or the functional characteristic of the identified area.

18. The medium according to claim 17, wherein when the information determined to be urgent includes information related to one of the locations where a display device is installed, the notification information is transmitted to the display device.

19. The medium according to claim 17, wherein the process of grasping a condition comprises:

health status grasping to grasp a health status of the individual livestock animal on the basis of the acquired information;

farming condition grasping to grasp farming conditions of the location on the basis of the acquired information;

environmental condition grasping to grasp environmental conditions of the location on the basis of the acquired information; and animal welfare condition grasping to grasp animal welfare conditions of the individual livestock animal or the location on the basis of the acquired information.

20. The medium according to claim 17, wherein the program further causes the hardware resources to execute: a process of controlling a facility when information related to the abnormal condition of the location among the stored information corresponds to a preset condition.

* * * * *